Figure 4:
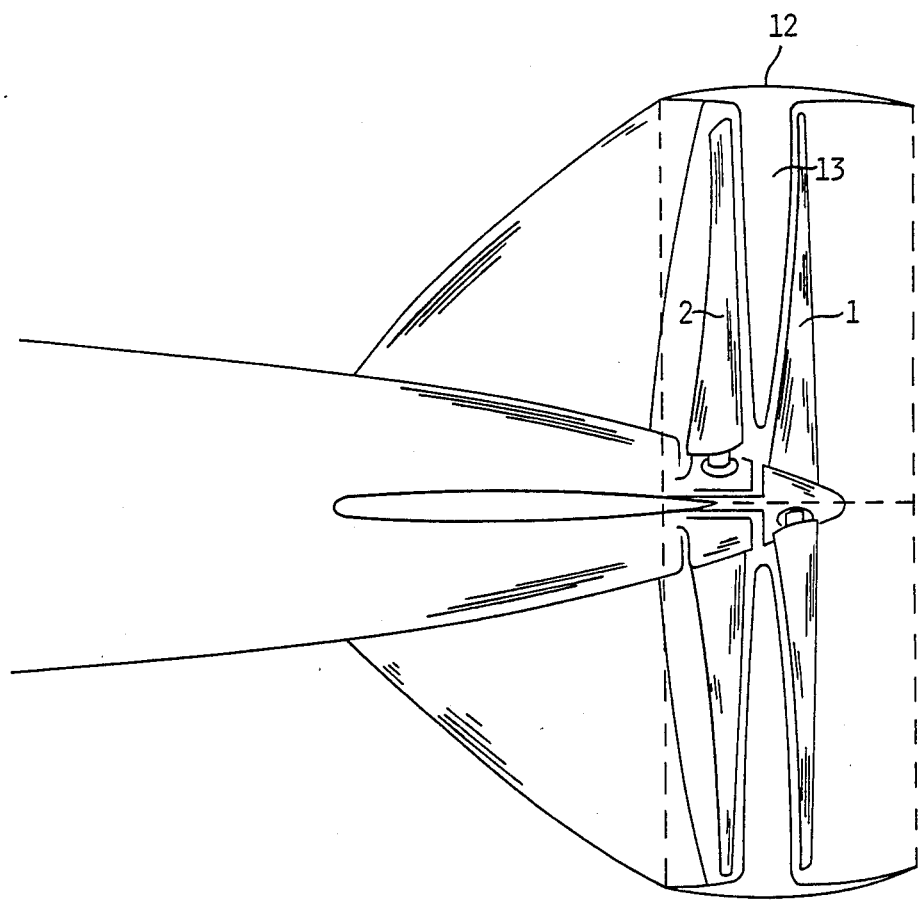

United States Patent [19]

Seefluth

[11] Patent Number: 4,676,459
[45] Date of Patent: Jun. 30, 1987

[54] DOUBLE PROPELLER FOR PROPELLING AIRCRAFT

[75] Inventor: Uwe C. Seefluth, Bissingen, Fed. Rep. of Germany

[73] Assignee: Sita Bauelemente GmbH, Pinneberg, Fed. Rep. of Germany

[21] Appl. No.: 683,816

[22] Filed: Dec. 20, 1984

[30] Foreign Application Priority Data

Dec. 31, 1983 [DE] Fed. Rep. of Germany ....... 3347679

[51] Int. Cl.$^4$ ...................... B64C 11/48; B64C 11/50
[52] U.S. Cl. ........................................ 244/65; 416/32; 244/60
[58] Field of Search ................... 244/65, 69, 60, 53 B, 244/DIG. 1.4; 416/125, 179, 189, 127, 130, 169 R, 32, 34, 43; 440/79, 80, 81; 415/66, 68, 69

[56] References Cited

U.S. PATENT DOCUMENTS 1,793,933  2/1931  Hoffman ............................ 416/125
2,477,637  8/1949  Mercier ............................. 244/53 B
2,978,208  4/1961  Halsmer ............................ 416/125

FOREIGN PATENT DOCUMENTS 222480   1/1925   Italy ..................................... 244/60
360643  11/1931   Italy ..................................... 244/60
 27082  of 1910  United Kingdom .................. 244/60

Primary Examiner—Joseph F. Peters, Jr.
Assistant Examiner—Rodney Corl
Attorney, Agent, or Firm—Max Fogiel

[57] ABSTRACT

Double propeller for propelling aircraft, with two coaxially and axially offset propellers that can be driven separately by associated drive mechanisms through a central shaft and a hollow shaft. To reduce noise and maintain safe operation even when one propeller drive breaks down, the propellers rotate in the same direction and can at at least one prescribed angle of rotation to each other be coupled together in such a way that they cannot rotate in relation to each other by means of a clutch that can be disengaged.

15 Claims, 5 Drawing Figures

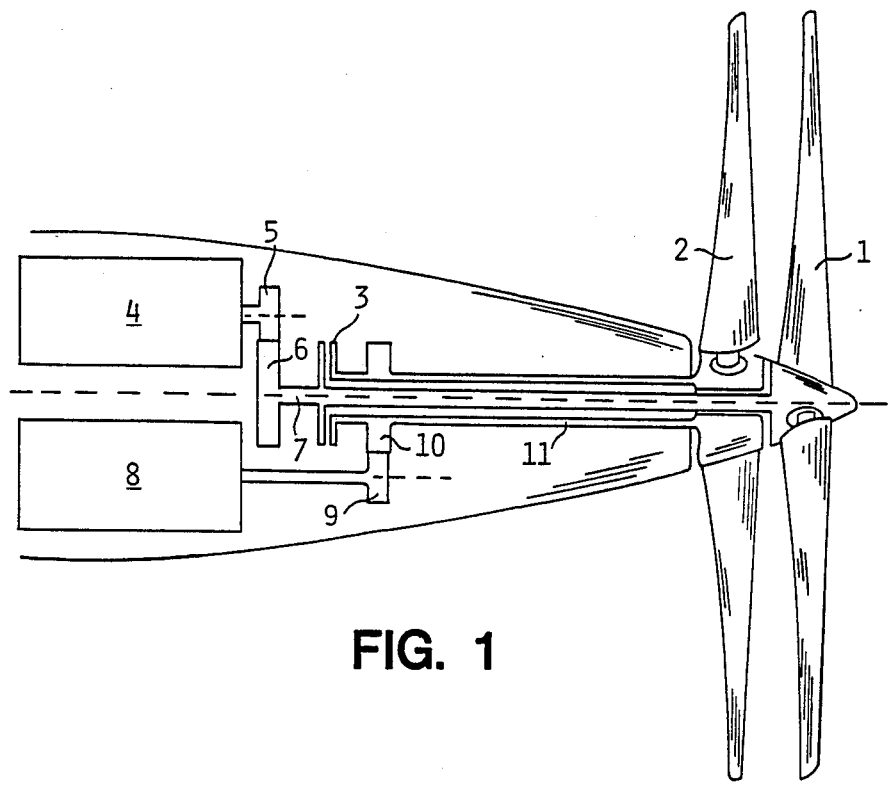
FIG. 1
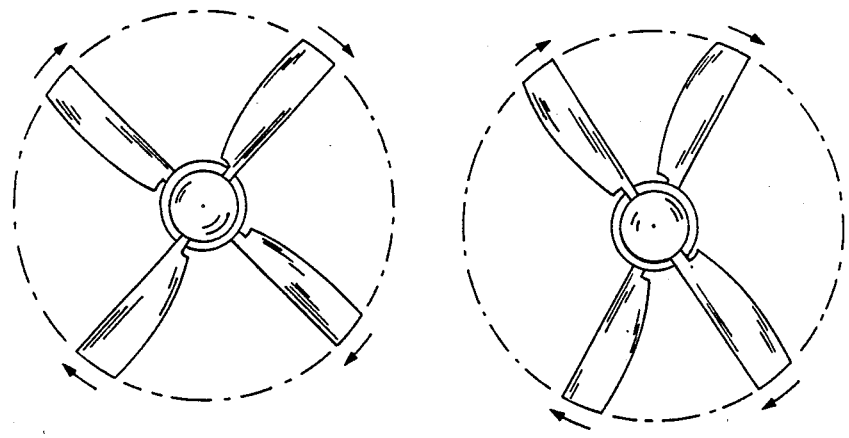
FIG. 2    FIG. 3

DOUBLE PROPELLER FOR PROPELLING AIRCRAFT

The invention concerns a double propeller for propelling aircraft, with the characteristics in the preamble to claim 1.

The double thrust propellers that have been proposed up to the present time operate in opposite directions and generate additional noise that is no longer acceptable. Other proposals involve operating two drive mechanisms on a common thrust propeller at the rear of the aircraft. The unavoidable common transmission and propeller-adjustment controls, however, make it impossible to achieve the safety characteristic of true bimotor drive.

The object of the invention is to provide a double-propeller drive of the aforesaid kind for thrust and tractor operation with propulsion that preferably parallels the longitudinal axis of the aircraft, that generates no additional noise, and that will operate safely even when one propeller drive breaks down.

Employing a double propeller with the characteristics in the preamble to claim 1, this object is attained in accordance with the invention by means of the characteristic in the body of the claim.

The method of driving the propeller in the same direction of rotation in accordance with the invention in conjunction with a clutch that allows an optimal angle of rotation to be maintained between the propellers results in unrestricted bimotor safety features accompanied by low-noise operation at a low manufacturing expenditure.

Although the clutch can be released or engaged manually or automatically, it will be especially released or engaged automatically, specifically, first, in relation to sensing the optimal angle of rotation of one propeller to the other and, second, in order to release the clutch when one drive mechanism malfunctions or breaks down, with the other drive mechanism continuing to operate unimpeded in conjunction with the individual propeller associated with it, contributing significantly to operational safety.

To keep the turbulent wake of the upstream propeller away from the downstream propeller, an angle of rotation between the two propellers will be prescribed by the clutch such that the blades of the upstream propeller will be positioned at an angle of less than 90° behind the immediately adjacent blades of the downstream propeller along the direction of rotation when the propellers are at the engage angle of rotation.

The two drive mechanisms can be positioned one downstream of the other along the direction of flight, each acting through a reducing gear on its associated shaft. In another embodiment, however, the drive mechanisms can be positioned one downstream of the other along the axis of the propellers and offset parallel to them if necessary. In this case, at least one of the drive mechanisms must have an adjacent by-pass shaft, with each shaft again acting through a reducing gear on its associated shaft or propeller. The clutch must of course also be appropriately incorporated in such a case.

Further embodiments of the invention will be evident from the subsidiary claims in conjunction with the drawings, to which special reference is made and the following description of which will explicate the invention in greater detail.

Figure 5:
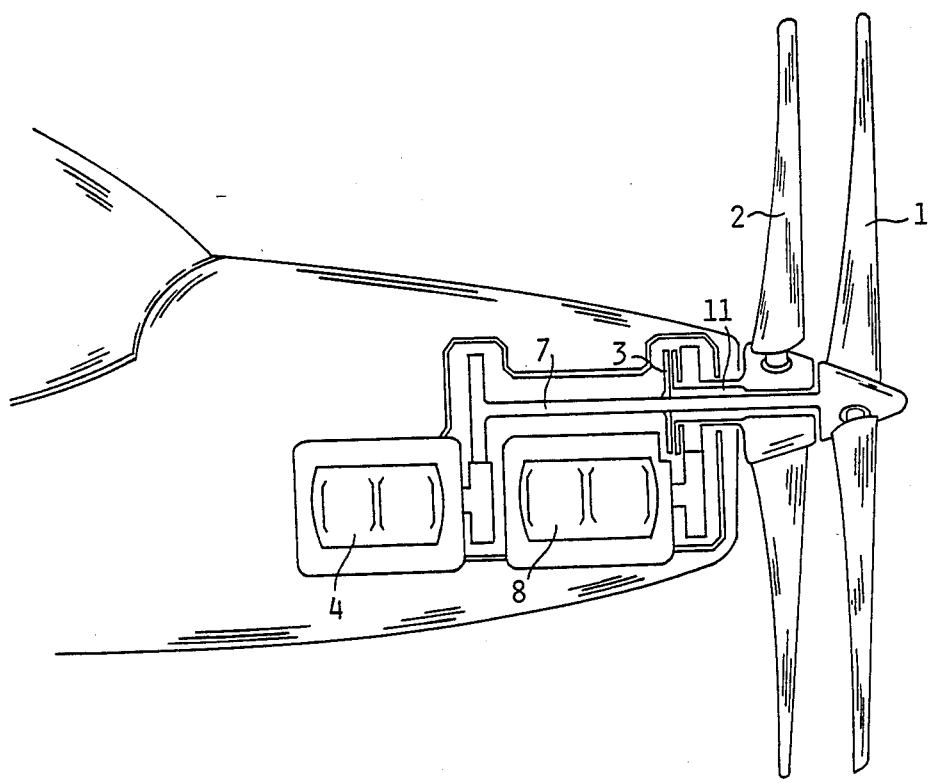

FIG. 1 is a schematic partly broken-open illustration of one embodiment of a double-propeller drive, FIG. 2 is a schematic top view of the double propeller at an angle of rotation such that one blade of one propeller is always offset about 90° from the adjacent blade of the other propeller, FIG. 3 is a view of the double propeller in FIG. 2 at a preferred angle of rotation at which the blades of the upstream propeller are positioned at an angle of less than 90°, 60° for example, behind the immediately adjacent blades of the downstream propeller along the direction of rotation, and FIGS. 4 and 5 are schematic illustrations of further embodiments and modifications.

As will be evident from FIG. 1, two propellers 1 and 2 are positioned, axially remote and coaxially, on shafts that can be coupled together by means of a clutch 3. A sensor, not illustrated, that detects the angle of rotation between propellers 1 and 2 is preferably associated with clutch 3. At at least one, and in particular optimized, angle of rotation, the sensor engages clutch 3, coupling the propellers 1 and 2 together in such a way that they cannot rotate in relation to each other.

In the embodiment illustrated in FIG. 1, the torque of a drive mechanism 4 is transmitted through cogwheels 5 and 6 to a central shaft 7, which propeller 1 is coupled to in such a way that it cannot rotate in relation to it.

The torque of a drive mechanism 8 is transmitted through cogwheels 9 and 10 to a hollow shaft 11, which propeller 2 is coupled to in such a way that it cannot rotate in relation to it.

As soon as the drive mechanisms have started both propellers 1 and 2 rotating in synchronization, clutch 3 couples their shafts 7 and 11 together in such a way that they cannot rotate in relation to each other. This preferably occurs only at a prescribed angle of rotation between the two propellers, which the sensor detects, engaging clutch 3.

Clutch 3 maintains the mutually non-rotating coupling between propellers 1 and 2 until a torque of a prescribed dimension occurs between shafts 7 and 11, which can be provoked for example by one of the drive mechanisms malfunctioning or breaking down. Clutch 3 can, however, also be governed otherwise or additionally as a function of the operating state of the drive mechanisms, in response for example to signals generated by overheating etc. Clutch 3 can also be governed manually if desired.

The angle of rotation between propellers 1 and 2 when clutch 3 is engaged can, as illustrated in FIG. 2, be symmetric, or, as illustrated in FIG. 3, asymetric.

The efficiency of the propellers can be increased by having the blades of the upstream propeller lag somewhat behind the blades of the downstream propeller. Thus, the rotationally lagging blades of upstream propeller 1 will not be in the turbulent wake of the rotationally advanced downstream propeller 2 as would be the case if the angle between the propellers were established symmetrically.

A comparable design can also be employed with multiple-blade, four-bladed for example, propellers. Especially when multiple-blade propellers are utilized in the form of a turbine, a preferred embodiment will feature stationary channeling fins 13 between propellers 1 and 2, preferably in conjunction specifically with a housing 12 around propellers 1 and 2 as illustrated in FIG. 4. Channeling fins of this type can also be positioned upstream or downstream or both of the double propeller, in conjunction if necessary with the channeling fins between them. This will increase the efficiency of the propellers even more.

In the embodiment illustrated in FIG. 1, the two drive mechanisms 4 and 8 are positioned adjacent to each other along the direction of flight, each coupled with its associated shaft 7 or 11 respectively through a transmission 5 and 6 or 8 and 10 respectively. In another embodiment, the drive mechanisms can be positioned one downstream of the other along the direction of flight. The latter embodiment will have at least one adjacent bypass shaft coupled in turn to their associated shafts through reduction gears. When the drive mechanisms are positioned one downstream of the other, the driveshafts must not absolutely be aligned. Effective solutions have already been developed in which space is saved by positioning the driveshafts parallel to the longitudinal axis of the propellers as illustrated in FIG. 5, where both drive mechanisms 4 and 8 are positioned one downstream of the other, parallel, below the propeller shafts, and with their axes aligned. Intermediate axis 7 functions in this case as a bypass axis for drive mechanism 8. Further modified embodiments are possible in accordance with space requirements, which depend on the aircraft model. The bypass shaft also does not therefore have to coincide with the intermediate or hollow shaft.

I claim:

1. A double propeller arrangement for propelling aircraft, comprising: two coaxial propellers axially offset; a central shaft carrying one propeller, said one propeller being fixedly attached to said central shaft; a hollow shaft concentric with said central shaft and surrounding said central shaft, the other propeller being fixedly mounted on said hollow shaft; each of said shafts having drive means for driving the respective propeller, said propellers being driven in the same direction and a predetermined angle relative to each other; disengageable clutch means for coupling said shafts so that said shafts cannot rotate relative to each other; said propellers being spaced from each other along a common axis of said shafts; one of said propellers comprising an upstream propeller with blades positioned at an angle less than 90 degrees behind immediately adjacent blades of the other downstream propeller in direction of rotation when said propellers are at an engage angle of rotation, said clutch means being engaged at said engage angle of rotation; said predetermined angle between said propellers being optimum for efficiency in operation and being set automatically through automatic coupling by said clutch means.

2. A double propeller arrangement as defined in claim 1, wherein each propeller has at least two blades.

3. A double propeller arrangement as defined in claim 1, wherein said clutch means can be automatically released and engaged.

4. A double propeller arrangement as defined in claim 1, wherein said clutch means has a torque sensor for disengaging said clutch means at a predetermined difference in driving torques applied to said shafts.

5. A double propeller arrangement as defined in claim 1, wherein said clutch means is positioned between said central shaft and said hollow shaft.

6. A double propeller arrangement as defined in claim 1, including first transmission means between said central shaft and the respective drive means; and second transmission means between said hollow shaft and the respective drive means.

7. A double propeller arrangement as defined in claim 6, wherein said clutch means is positioned parallel to the axis of said shafts and between said first and second transmission means.

8. A double propeller arrangement as defined in claim 1, wherein said clutch means as a sensor for detecting angle of rotation.

9. A double propeller arrangement as defined in claim 1, wherein said propellers have blades mutually offset along the direction of rotation at said engage angle of rotation.

10. A double propeller arrangement as defined in claim 1, including stationary channeling fins positioned in proximity of said propellers for increasing efficiency of operation.

11. A double propeller arrangement as defined in claim 1, including a housing enclosing said propellers, said housing being rigidly attached to the aircraft.

12. A double propeller arrangement as defined in claim 1, wherein said drive means are positioned adjacent to each other along said two shafts; first transmission means connecting said central shaft to the respective drive means; and second transmission means connecting said hollow shaft to the respective drive means.

13. A double propeller arrangement as defined in claim 1, wherein one of said drive means is positioned downstream of the other drive means substantially along said shafts, and at least one adjacent bypass shaft.

14. A double propeller arrangement for propelling aircraft, comprising: two coaxial propeller axially offset; a central shaft carrying one propeller, said one propeller being fixedly attached to said central shaft; a hollow shaft concentric with said central shaft and surrounding said central shaft, the other propeller being fixedly mounted on said hollow shaft; each of said shafts having drive means for driving the respective propeller, said propellers being driven in the same direction and at a predetermined optimum angle relative to each other; disengageable clutch means for coupling said shafts so that said shafts cannot rotate relative to each other; said propellers being spaced from each other along a common axis of said shafts; one of said propellers comprising an upstream propeller with blades positioned at an angle less than 90 degrees behind immediately adjacent blades of the other downstream propeller in direction of rotation when said propellers are at an engage angle of rotation, said clutch means being engaged at said engage angle of rotation; a torque sensor for disengaging said clutch means at a predetermined difference in driving torques applied to said shafts; said clutch means having a sensor for detecting angle of rotation; stationary channeling fins positioned in proximity of said propellers for increasing efficiency of operation; and a housing for supporting said fins, said predetermined angle between said propellers being optimum for efficiency in operation and being set automatically through automatic coupling by said clutch means.

15. A double propeller arrangement for propelling aircraft, comprising: two coaxial propellers axially offset; a central shaft carrying one propeller, said one propeller being fixedly attached to said central shaft; a hollow shaft concentric with said central shaft and surrounding said central shaft, the other propeller being fixedly mounted on said hollow shaft; each of said shafts having drive means for driving the respective propeller, said propellers being driven in the same direction and at a predetermined angle relative to each other; disengageable clutch means for coupling said shafts so that said shafts cannot rotate relative to each other; said propellers being spaced from each other along a common axis of said shafts; one of said propellers comprising an upstream propeller with blades positioned at an angle less than 90 degrees behind immediately adjacent blades of the other downstream propeller in direction of rotation when said propellers are at an engage angle of rotation, said clutch means being engaged at said engage angle of rotation; a torque sensor for disengaging said clutch means at a predetermined difference in driving torques applied to said shafts; said clutch means having a sensor for detecting angle of rotation; stationary channeling fins positioned in proximity of said propellers for increasing efficiency of operation; and a housing for supporting said fins; each propeller having at least two blades; said clutch means being released and engaged automatically; said clutch means being positioned between said central shaft and said hollow shaft; transmission means for coupling each shaft to the respective drive means; said clutch means being positioned parallel to the axis of said shafts between said transmission means and said drive means; said propellers having blades mutually offset along direction of rotation at said engage angle of rotation; said two drive means being positioned adjacent to each other along said two shafts and coupled to the respective shafts through said transmission means; one of said drive means being positioned downstream of the other drive means substantially along said shafts, and at least one adjacent bypass shaft; said predetermined angle between said propellers being optimum for efficiency in operation and being set automatically through automatic coupling by said clutch means.

* * * * *